(12) United States Patent
Mayer et al.

(10) Patent No.: US 11,274,912 B2
(45) Date of Patent: Mar. 15, 2022

(54) MEASURING SYSTEM

(71) Applicant: HEXAGON TECHNOLOGY CENTER GMBH, Heerbrugg (CH)

(72) Inventors: Tim Mayer, Horn (CH); Jochen Scheja, Hohenems (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 289 days.

(21) Appl. No.: 16/680,296

(22) Filed: Nov. 11, 2019

(65) Prior Publication Data
US 2020/0149857 A1 May 14, 2020

(30) Foreign Application Priority Data
Nov. 12, 2018 (EP) .................................. 18205764

(51) Int. Cl.
G01B 5/004 (2006.01)
G01B 3/00 (2006.01)
G01B 3/56 (2006.01)

(52) U.S. Cl.
CPC ............. G01B 5/004 (2013.01); G01B 3/002 (2013.01); G01B 3/56 (2013.01)

(58) Field of Classification Search
CPC .......... G01B 5/004; G01B 3/002; G01B 3/56; G01B 3/11; G01B 3/1005; G01B 3/1061; G01B 3/563
See application file for complete search history.

(56) References Cited

U.S. PATENT DOCUMENTS 5,768,797 A    6/1998  Trevino
6,223,446 B1*  5/2001  Potter .................. G01B 3/1041
                                                     33/764
(Continued)

FOREIGN PATENT DOCUMENTS

CN    2035866 U    4/1989
CN    2690848 Y    4/2005
(Continued)

OTHER PUBLICATIONS

Mia Jianmin, "Research on Calibration Method of Hand-Held Laser Rangefinder" China Academic Journal Electronic Publishing House, Apr. 30, 2003.
(Continued)

Primary Examiner — Yaritza Guadalupe-Mccall
(74) Attorney, Agent, or Firm — Maschoff Brennan

(57) ABSTRACT

A measuring system comprising a measuring apparatus including a first portion comprising a first casing, a first length measuring body, a first length measuring device, and a first reference point. A first end of the first length measuring body is attached to the first casing, a second end extends away from the first casing, the first length measuring device measures a first distance between the second end and the first reference point; a second portion comprising a second casing, a second length measuring body, a second length measuring device, and a second reference point. A first end of the second length measuring body is attached to the second casing, a second end extends away from the second casing, the second length measuring device measures a second distance between the second end and the second reference point. The first and second portion are coupled and rotate relative to each other.

15 Claims, 3 Drawing Sheets

(56) References Cited

U.S. PATENT DOCUMENTS

| | | | |
|---|---|---|---|
| 6,785,973 B1 | 9/2004 | Janssen | |
| 7,549,235 B2* | 6/2009 | Alders | G01B 3/1084 33/760 |
| 7,600,326 B2* | 10/2009 | Plucknett | G01B 3/1084 33/760 |
| 8,684,295 B2* | 4/2014 | Taketsuna | B65H 75/4431 242/378.4 |
| 8,881,417 B2* | 11/2014 | Sano | G01B 5/24 33/512 |
| 9,335,225 B2* | 5/2016 | Xu | G01L 5/0052 |
| 10,634,476 B1* | 4/2020 | Bautista | G01B 3/566 |
| 10,926,576 B2* | 2/2021 | Franco | B43L 13/00 |
| 2005/0223582 A1* | 10/2005 | Baugh | G01B 3/1003 33/764 |
| 2009/0009360 A1 | 1/2009 | Flannigan et al. | |
| 2011/0066399 A1 | 3/2011 | Mahajan | |
| 2014/0190030 A1* | 7/2014 | Sano | A61B 5/1071 33/534 |
| 2016/0066399 A1 | 3/2016 | Nakagomi et al. | |
| 2020/0149857 A1* | 5/2020 | Mayer | G01B 3/002 |
| 2020/0191540 A1 | 6/2020 | Li | |

FOREIGN PATENT DOCUMENTS

| | | |
|---|---|---|
| CN | 2864585 Y | 1/2007 |
| CN | 201897442 U | 7/2011 |
| CN | 104634314 A | 5/2015 |
| CN | 205138388 U | 4/2016 |
| CN | 107339923 A | 11/2017 |
| CN | 207095565 U | 3/2018 |
| CN | 108489389 A | 9/2018 |
| ES | 223955 Y | 1/1977 |
| JP | S56-101501 A | 8/1981 |
| JP | S56101501 A | 8/1981 |
| JP | H07-141099 A | 6/1995 |
| JP | H07141099 A | 6/1995 |

OTHER PUBLICATIONS

Extended European Search Report dated Jan. 28, 2019 as received in Application No. 18205764.6.

Ma Jianmin, "Research on Calibration Method of Hand-Held Laser Rangefinder" China Academic Journal Electronic Publishing House, Apr. 30, 2003.

CN Search Report in Application No. 201911087209.5 dated Feb. 1, 2021.

* cited by examiner

MEASURING SYSTEM

CROSS-REFERENCE TO RELATED APPLICATIONS

This application claims priority to European Patent Application No. 18205764.6, filed on Nov. 12, 2018. The foregoing patent application is herein incorporated by reference.

FIELD OF THE INVENTION

The present invention relates to a measuring system designed for measurement and/or stake-out tasks, particularly in construction, (interior) building, gardening, and/or (interior) architecture.

FIELD OF THE INVENTION

The present invention relates to a measuring system designed for measurement and/or stake-out tasks, particularly in construction, (interior) building, gardening, and/or (interior) architecture.

SUMMARY OF THE INVENTION

Some aspects of the invention relate to a measuring system comprising a measuring apparatus and an arithmetic device, wherein the measuring apparatus comprises a first portion comprising a first casing, a first length measuring body, a first length measuring device, and a first reference point; a first end of the first length measuring body being attached to the first casing, a second end of the first length measuring body being extensible away from the first casing, the first length measuring device configured to measure a first distance, the first distance extending between the second end of the first length measuring body and the first reference point; a second portion comprising a second casing, a second length measuring body, a second length measuring device, and a second reference point; a first end of the second length measuring body being attached to the second casing, a second end of the second length measuring body being extensible away from the second casing, the second length measuring device configured to measure a second distance, the second distance extending between the second end of the second length measuring body and the second reference point; the first portion and the second portion being coupled and configured to be rotatable relative to each other around an axis of rotation; wherein the arithmetic device is configured for determining measured data based on at least one of the first distance and the second distance, and providing the measured data.

Determining the measured data may be based on the first distance measured at a first time, the second distance measured at a second time, the first distance measured at a third time, and the second distance measured at a fourth time.

In particular, the first time and the second time are coincident, and the third time and the fourth time are coincident.

The measuring apparatus may comprise a first angle measuring device configured to measure a first angle, the first angle representing a relative rotational position between the first portion and the second portion with respect to the axis of rotation, wherein determining the measured data may be based on the first angle.

Determining the measured data may be based at least on the first distance and the second distance, and wherein the measured data may comprise at least one of a third distance extending between the second end of the first length measuring body and the second end of the second length measuring body, a fourth distance extending between at least one of the first and second reference points and the third distance and being aligned in a right angle relative to the third distance, a fifth distance forming a right triangle together with the first distance and the fourth distance, a sixth distance forming a right triangle together with the second distance and the fourth distance, a second angle being formed by the third distance and the first length measuring body, a third angle being formed by the third distance and the second length measuring body, and a relative position of at least one of the first reference point and the second reference point.

The measuring apparatus may further comprise a pointer which is coupled with at least one of the first portion and the second portion, the pointer being configured to be rotatable relative to the first portion and the second portion around the axis of rotation, and a second angle measuring device configured to measure a fourth angle, the fourth angle representing a relative rotational position between the pointer and one of the first portion and the second portion with respect to the axis of rotation, wherein determining the measured data may be based on the first angle, and wherein the first reference point and the second reference point may both be located at a tip of the pointer or located on an axis parallel to the axis of rotation and running through the tip of the pointer.

The first reference point and the second reference point may be both located on the axis of rotation or on an axis parallel to the axis of rotation.

The arithmetic device may be configured for receiving a user input, and wherein determining the measured data may be based on the user input.

The arithmetic device may be configured such that the user input effects at least one of zeroing of measurement data, definition of a measurement mode, definition of a stake-out mode, and definition of a coordinate system.

The coordinate system may be definable based on at least one of the measured data, the first distance, the second distance, and a third distance connecting the first end of the first length measuring body with the first end of the second length measuring body.

The arithmetic device is configured for generating instruction data for a user for performing a stake-out, and wherein the measuring system may comprise a display device which is configured for displaying instructions based on the instruction data.

The measuring apparatus may further comprise a third angle measuring device configured to measure a fifth angle, the fifth angle being formed by the first length measuring body and a plane perpendicular to the axis of rotation, or the second length measuring body and the plane perpendicular to the axis of rotation, wherein determining the measured data may be based on the fifth angle.

The measuring apparatus may comprise an adapter configured for mounting a tool such that the tool adopts a predefined pose relative to at least one of the first reference point and the second reference point.

In a further embodiment, each of the first length measuring body and the second length measuring body may be a string, a cord, a wire, a ribbon, a chain, or a telescopic rod system.

In a further embodiment, the measuring apparatus may comprise a handle which is coupled with at least one of the first portion and the second portion, the handle being configured to be rotatable relative to the first portion and the second portion around the axis of rotation.

In a further embodiment, the measuring system may comprise a display device configured for receiving and displaying the measured data. Such display device may be comprised by the measuring apparatus or by an external device.

Some aspects of the invention also relate to a method comprising providing a measuring system according to the description herein, fixing the second end of the first length measuring body at a first measuring point, fixing the second end of the second length measuring body at a second measuring point, positioning the measuring apparatus such that at least one of the first reference point and the second reference point lays on a third distance extending between the second end of the first length measuring body and the second end of the second length measuring body, measuring the first distance at a first time, measuring the second distance at a second time, determining the third distance based on the first distance measured at the first time and the second distance measured at the second time, positioning the measuring apparatus such that at least one of the first reference point and the second reference point lays on a third measuring point, measuring the first distance at a third time, measuring the second distance at a fourth time, determining a position of the third measuring point relative to at least one of the first measuring point and the second measuring point based on the first distance measured at the third time, the second distance measured at the fourth time, and the third distance.

In particular, the first time and the second time are coincident, and the third time and the fourth time are coincident.

Some aspects of the invention also relate to a method comprising providing a measuring system according to the description herein, fixing the second end of the first length measuring body at a first measuring point, fixing the second end of the second length measuring body at a second measuring point, positioning the measuring apparatus such that at least one of the first reference point and the second reference point lays on a third measuring point, measuring the first distance, measuring the second distance, measuring the first angle, determining a position of the third measuring point relative to at least one of the first measuring point and the second measuring point based on the first distance, the second distance, and the first angle.

Any of the above mentioned methods may further comprise positioning the measuring apparatus such that at least one of the first reference point and the second reference point lays on a fourth measuring point, in the same manner as the third measuring point was determined, determining a position of the fourth measuring point relative to at least one of the first measuring point and the second measuring point, defining a coordinate system based on the position of the third measuring point and the position of the fourth measuring point.

In particular, one of the third and fourth measuring point may be considered to be the origin of the coordinate system and the respective other measuring point defines the alignment of the x-axis or the y-axis.

A measuring apparatus may particularly be used for guiding another device to a defined position.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

In the prior art there are various ways for staking out points. One common procedure to stake out a point with a measuring tape is based on the use of Pythagoras' theorem. For example, a cord is spanned between two sticks such that the distance between the two sticks is exactly 3 meters, which can be confirmed with a measuring tape. Then a 4-meter-long section of the cord is spanned from a selected one of the sticks roughly in a 90-degree angle away from the stretch between the two sticks. Starting from the stick other than the selected stick, the measuring tape is spanned towards the end of the 4-meter-long section of the cord, wherein a meeting point of the cord end and the measuring tape is found where a third stick can be positioned. The three sticks form a right-angled triangle. Of course this procedure can be varied in many different ways, wherein the 3:4:5 relation of the triangle sides must be maintained in order to span a quasi-perfect 90-degree angle in the triangle.

The usage of the Pythagoras' theorem is relatively simple but it requires a right-angled triangle. Using an oblique triangle is simplifying the handling but complicates the calculation.

With an embodiment of the invention, therefore, it is possible to automatically take into account the trigonometrical principles in order to make measuring or stake-out tasks a lot easier to manage while said triangle is no longer required to be right-angled. Said trigonometrical principles may comprise for example the law of sines, the law of cosines, the law of tangents, the half-angle formula, Mollweide's formula, and/or angle sum. The invention allows users not experienced with the matter to perform measurements and/or stake-outs, saves operating times, and eliminates a significant source of error.

The measuring system according to the invention comprises a measuring apparatus and an arithmetic device. The arithmetic device could be included in the measuring apparatus or it could be located in an external device, such as a smartphone, tablet PC, or any such separate controller. In the latter case, the measuring apparatus and the arithmetic device may be connectable by wireless (such as Bluetooth, WiFi, radio link, etc.) technology or based on wire.

Figure 1:
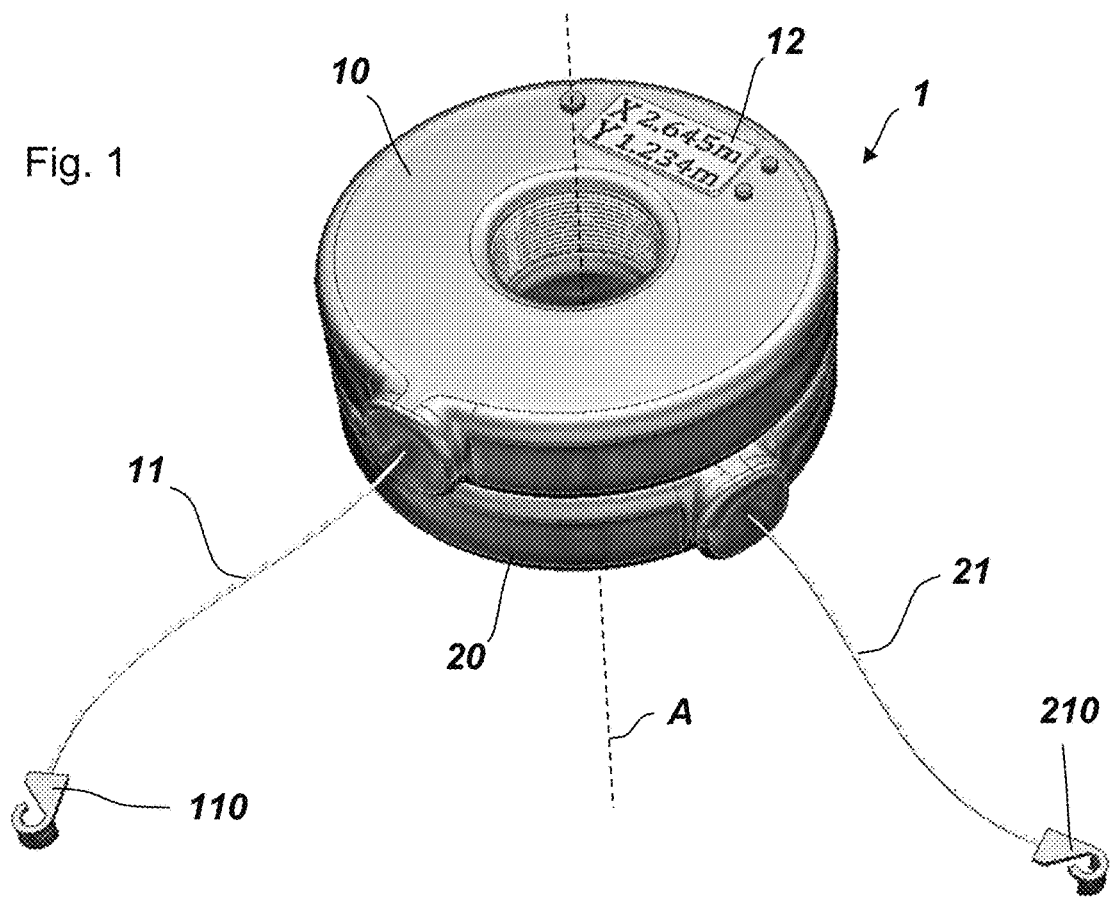
FIG. 1 shows an embodiment of a measuring apparatus with a threaded tool adapter.

FIG. 1 shows one embodiment of a measuring system according to the invention, wherein the arithmetic device is integrated into the measuring apparatus 1. It comprises a first portion 10 and a second portion 20. The first portion 10 has a first length measuring body 11 and the second portion 20 has a second length measuring body 21, both exemplarily embodied as a string retractably rolled inside their respective casing. The length measuring body could as well be embodied as a string, a cord, a wire, a ribbon, or a chain. In a special embodiment, the length measuring body can be a telescopic rod system configured in a way similar to a retractable antenna of an automobile.

A first end of the respective length measuring body 11/21 is attached to the inside of the respective casing. A second end of the respective length measuring body 11/21 is extensible away from the respective casing. Said second ends can comprise an attachment body 110/210, such as a hook or a ring, by means of which they can each be fixed to a desired location.

The respective portions 10/20 each comprise a respective length measuring device and a respective reference point $R_1/R_2$. The length measuring devices are configured to measure a respective distance extending between the respective second end of the respective length measuring body 11/21 and the respective reference point. The first and second reference point lay in this example in the centres of the respective portion 10/20 and on the axis A. The reference points can however also coincide and/or be located in a predetermined offset with regard to the axis A. In case the length measuring body is a body winding on and unwinding from a coil, the length measuring device is measuring the current length by sensing the length measuring body either relatively or absolutely. The length could be measured by the length measuring device based e.g. on code reading (optical, magnetical, or mechanical), motor commutation, electric resistance, capacitance, magnetostriction, or induction. A mechanical solution of the length measurement could base on a shaped wire (e.g. grooved in a certain pattern) or on a chain with defined links that are counted or decoded.

The first and second portions are coupled and configured such that they are rotatable relative to each other around an axis of rotation A which runs through the centres of the portions. Optionally, this rotation can be quantified by a first angle measuring device which can be comprised by the measuring apparatus. In particular, the angle enclosed by the first and second length measuring bodies (="first angle $\alpha$") is determinable by the first angle measuring device. Alternatively, a different angle from which the first angle is derivable can be determinable. The first angle measuring device may be incorporated in a separate housing, or may be integrated in the first or second casing. Said separate housing may for example be arranged between the first and second casing.

Figure 2:
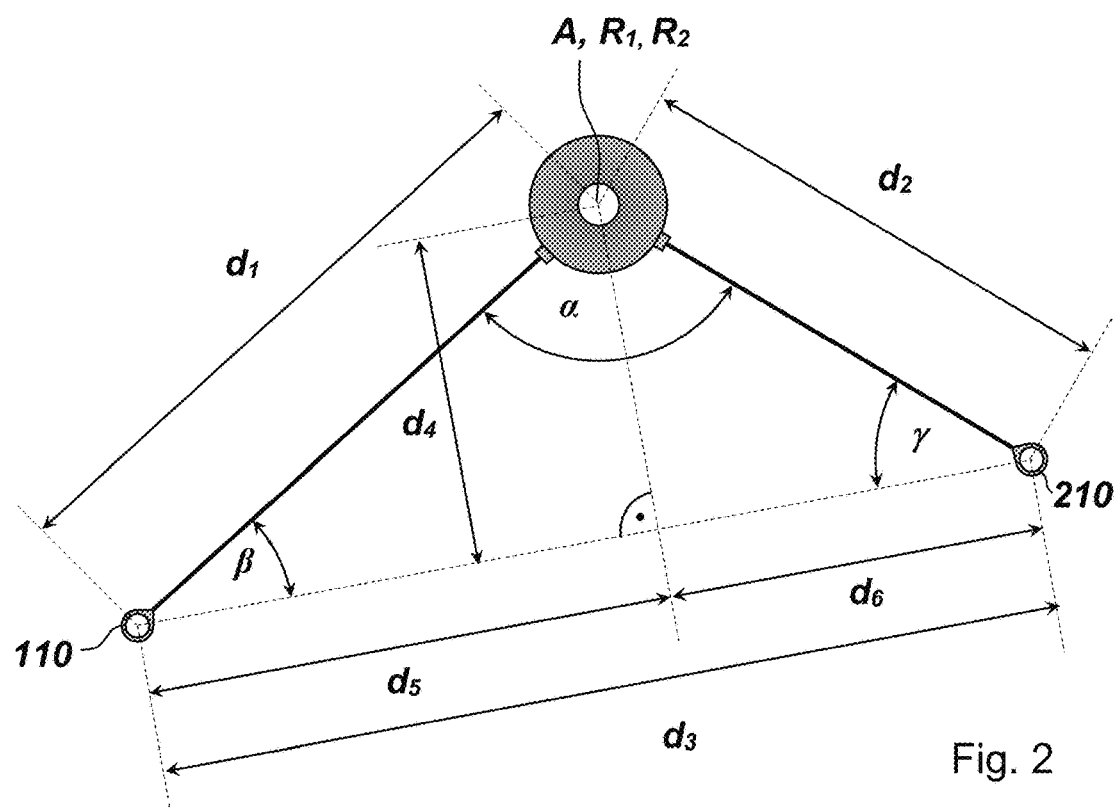
FIG. 2 shows a schematic view of the trigonometrical relations of the involved items.

The measuring system further comprises an arithmetic device configured for determining and/or providing measured data, in particular a measured value. Referring now to FIG. 2, basic measured data can be the first length $d_1$ and the second length $d_2$. Based on the above mentioned trigonometrical principles (e.g. the law of cosines), further measured data can be derived (determined), for example a third distance $d_3$ between the second end of the first length measuring body and the second end of the second length measuring body.

However, distance $d_3$ can also be measured by placing the measuring apparatus by the reference point(s) right onto the line connecting the hooks 110 and 210. Particularly in this case, a first angle measuring device is not necessary because by knowing all the three lengths of the triangle ($d_1$, $d_2$, $d_3$) the angles and the relative position of the reference point(s) can be derived by means of the above mentioned trigonometric laws.

In other words, the hooks 110 and 210 are each attached to a rigid location, and the measuring apparatus is placed such that the first reference point and/or the second reference point rest(s) on the direct connection line between the two locations where the hooks are attached. In this arrangement, the first and second length measuring bodies are aligned. Then, the first distance is measured at a first point in time, and the second distance is measured at a second point in time, wherein the first and second points in time can be different or identical. The measured first distance $d_1$ and second distance $d_2$ can now be summed up in order to arrive at the third distance $d_3$. Based on this $d_3$-measurement, the measuring apparatus can be replaced to a desired point to be measured or staked out, wherein such measurement/stake-out is based on a first distance measured at a third time and a second distance measured at a fourth time. The third and fourth time may be coincident, but the third time is different from the first and second time, and the fourth time is different from the first and second time.

The measured data may further comprise a measured value of a fourth distance $d_4$ between at least one of the first and second reference points and third distance $d_3$. The fourth distance is aligned in a right angle relative to the third distance $d_3$. Further possible measured values are the angles $\beta$ ("second angle" which is spanned by the first measuring body and the distance $d_3$) and $\gamma$ ("third angle" which is spanned by the second measuring body and the distance $d_3$).

In a special embodiment, the arithmetic device can also provide x- and y-distances as is shown on a display device comprised by the embodiment of FIG. 1. The origin and the alignment of the coordinate system is (re)settable/definable. Alternatively, the zero point of the x-axis and the zero point of the y-axis could respectively be (re)set separately. This functionality will be explained later in context of FIG. 5.

Figure 3:
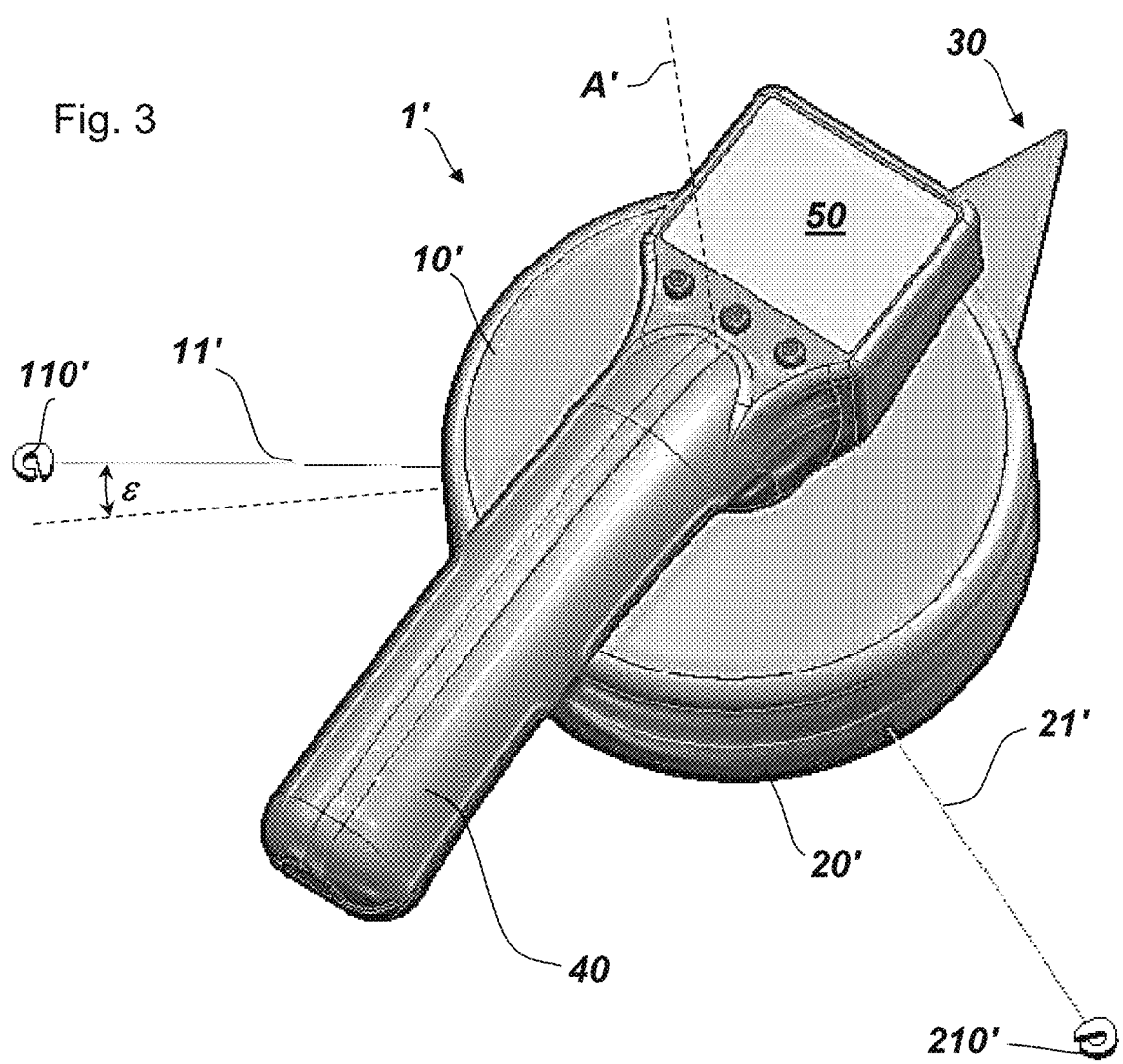
FIG. 3 shows another embodiment of a measuring apparatus with a pointer tip and a handle.
Figure 4:
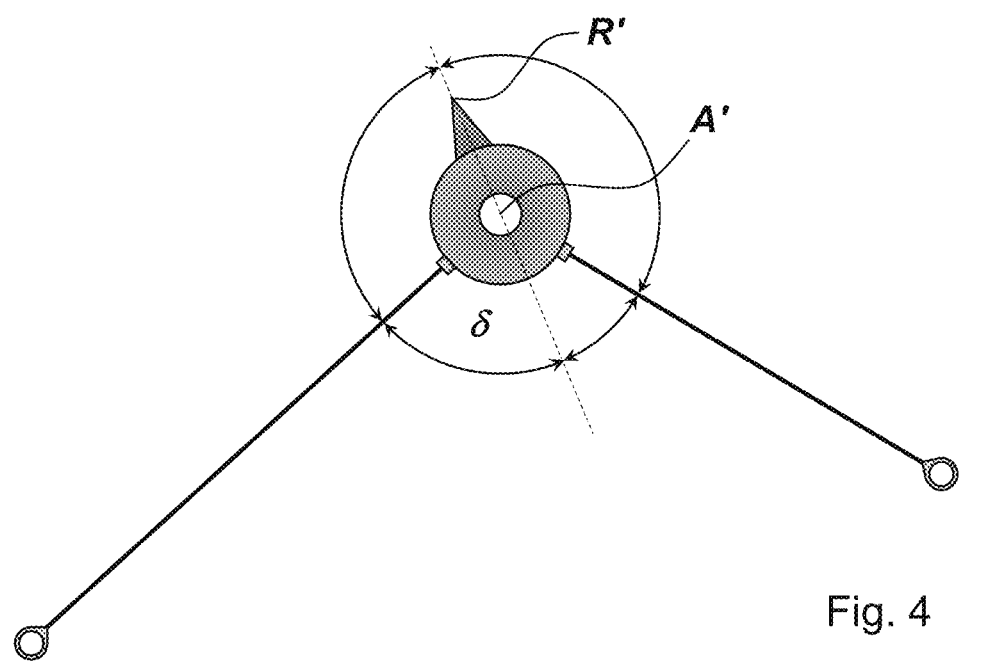
FIG. 4 shows in a schematic view a fourth angle measured with the embodiment of FIG. 3.

In another example, as can be seen in FIG. 3, a measuring apparatus embodiment 1' comprises a pointer 30 whose tip can be declared the reference point R' (first and second reference point which were mentioned before are coinciding here) for the distance measurements of the first and second length measuring bodies 11'/21'. In this case, the measuring apparatus further comprises a second angle measuring device which measures a fourth angle $\delta$ (see FIG. 4) in order to derive the correct distance between the second ends of the length measuring bodies and the "eccentric" reference point R'. This could be done by adding the eccentric offset to the distances as they are measured according to the embodiment shown in FIGS. 1/2. Generally, the fourth angle $\delta$ is related to a rotational position of the pointer 30. Hence, the labelling of $\delta$ in FIG. 4 is exemplary because the fourth angle $\delta$ can be anywhere as long as an alignment of the pointer tip relative to at least one of the first and second length measuring body can be determined (see further circular arrows about axis A' in FIG. 4). For this conclusion, the radial distance between the pointer tip and the axis of rotation A' as well as the rotational position of the pointer 30 relative to at least one of the first and second portions 10'/20' are considered. So even though the cords 11' and 21' are not running from the second ends of the respective length measuring body directly towards the pointer tip, the arithmetic device can still determine the actual distance between the pointer tip and the respective second ends of the length measuring bodies.

As a further optional extra, the measuring apparatus 1' may comprise a handle 40 which is coupled with at least one of the first and second portion such that it is rotatable relative to the first and second portion around the axis of rotation A'. The handle 40 may be rigidly coupled with the pointer 30 such that an ergonomic positioning of the measuring apparatus 1' onto/against a measuring point is provided. The apparatus 1' may further have a display 50 for outputting measuring results, in particular measured data or even measured layouts (concatenations of measuring points on a map). As already mentioned, such a display device may also be provided as a device external to the measuring apparatus, such as a tablet PC.

The first and second distances $d_1$ and $d_2$ are measured by the respective first and second length measuring device. For example, a length measuring device can technologically base on detecting the rotation of the wire spool from which the cord 11/21 is rolled up and off. As well, the rotation of an additional guide pulley could be detected. The respective rotation of the spool or the pulley could be sensed by a potentiometer and a connected transducer. Alternatively, the length measuring device can base on an optical, a magnetic, a capacitive, or an eddy-current detection of the length measuring body. Specifically, the wire/cord may be accordingly configured to act as a scale which is readable by an encoder. For example, the length measuring body being a cord could be engrailed or be designed to have integrated a structural or magnetic pattern (either absolute or relative).

The length measuring body can be embodied such as being manually or automatically retractable by means known in the art of measuring tapes. For example, the length measuring body could be retracted by a crank handle, a spiral spring, a motor, a constant force spring, or a combination of the aforementioned.

In a special embodiment, the measuring apparatus may further comprise a third angle measuring device for measuring a fifth angle s (see FIG. 3) which is spanned by the first measuring body and a plane perpendicular to the axis of rotation (A/A'). Accordingly, a fourth angle measuring device could be integrated into the measuring apparatus such that a sixth angle (not shown) can be measured, said sixth angle spanned between the second measuring body and the plane perpendicular to the axis of rotation (A/A'). The fifth and sixth angles may be taken into account when determining the measured data, e.g. to correct the inclined plane of measurement. The third and fourth angle measuring devices could e.g. detect a distance from the casing of the respective first and second portion in a direction parallel to the axis of rotation (A/A'), wherein the respective length measuring body can freely move in a slot giving way to a predefined angle range (e.g. between −20° and +20°).

Instead of or additional to the third and fourth angle measuring devices, the measuring apparatus may comprise a respective detection device configured for detecting if the length measuring body is leaving the case in an angle beyond a predefined range. In other words, said detection device is checking if the angle (and/or is exceeding a threshold value or not. This detection may have the advantage over an actual angle measurement in that it is technically less complex. A downside would be that the measured data would not be able to be corrected but instead, the user could be warned that the angle (and/or ξ) is too big for ensuring a precise measurement.

Another use case of the presented measuring apparatus is to attach a plummet to one of the second ends of the length measuring bodies in order to have an exact vertical and to be able to measure an angle with respect to this vertical by means of the respective other length measuring body. This arrangement is specifically useful when measuring on a vertical wall, i.e. when the axis of rotation A/A' is horizontal.

In a further use case, a (part of a) circumference can be measured by wrapping the second ends of the length measuring bodies around a circular or angular body, such as a pillar.

In yet another use case, a centre of a stretch (line or curve) can be determined by seeking for the place where the first distance and the second distance are equal.

Also, it is possible with the presented measuring apparatus to perform highly precise angle measurements, because the legs (length measuring bodies) of the triangle can be extended much longer compared to a conventional goniometer.

A special feature that the measuring apparatus may comprise is an adapter for interfacing tools. Specifically, this can be embodied by a threaded recess (see FIG. 1) in the centre of one of the portions. Many different accessories can be attached to this adapter. One or more of the following add-ons/accessories can particularly be attached to the measuring apparatus by means of this adapter, or they can also be arranged on the measuring apparatus rigidly:

a cable detector, in particular for generating a power cable layout plan;

a metal detector, in particular for generating a pipe layout plan;

a laser plane detector for keeping a height defined by the laser plane from one wall to another wall;

additionally to the laser plane detector or as stand-alone: an EDM (Electronic Distance Meter) module for detecting a distance perpendicular to the length measuring bodies;

a physical plummet or a laser plummet for indicating a vertical that is perpendicular to the length measuring bodies;

a bubble level for levelling either the length measuring bodies or the measuring apparatus in a direction perpendicular to the length measuring bodies;

a (referenced) printer, a spray can, a pen (holder), or a centre punch for marking a specific point;

a drilling jig for supporting a drilling procedure and avoiding a preceding marking step; and a reticle for supporting a user of the measuring apparatus to locate a measuring/stake-out point.

Furthermore, the measuring apparatus can have a third portion configured just like the first and second portion, or it can have even more than three portions. The further portion(s) is/are coupled with the first and second portion and configured to be rotatable relative to the first and second portion around the axis of rotation.

The measurement data gathered with the measuring system are relative and there are many ways to define a corresponding coordinate system with/for the arithmetic device.

For example, the second end of the first length measuring body (e.g. by the hook 110) is fixed to a first measuring point which may be declared as the origin (x- and y-coordinate are zero). The second end of the second length measuring body (e.g. by the hook 210) is fixed to a second measuring point. Then the reference point(s) can be expressed in x- and y-distances from the origin wherein the distance $d_3$ may serve as reference line (direction of x- or y-axis). In case the distance $d_3$ serves as x-axis, the y-coordinate is the fourth distance $d_4$ and the x-coordinate is a fifth distance $d_5$. The currently measured x- and y-coordinates, or the x- and y-coordinates as captured from a previous measurement, can be output with an optional display 12/50.

The hook 210 (second end of the second length measuring body) could be declared origin as well. The reference point(s) could also be declared the origin of the coordinate system wherein it could be chosen if the measured x- and y-coordinates refer to the hook 110 or to the hook 210 (the respective other hook is needed to span the reference line).

Above mentioned origin can e.g. be set to be the pointer tip by pressing a button on the measuring apparatus or via remote control. The pointer tip is especially helpful, when a room corner needs to be measured or is involved in defining the coordinate system.

Figure 5:
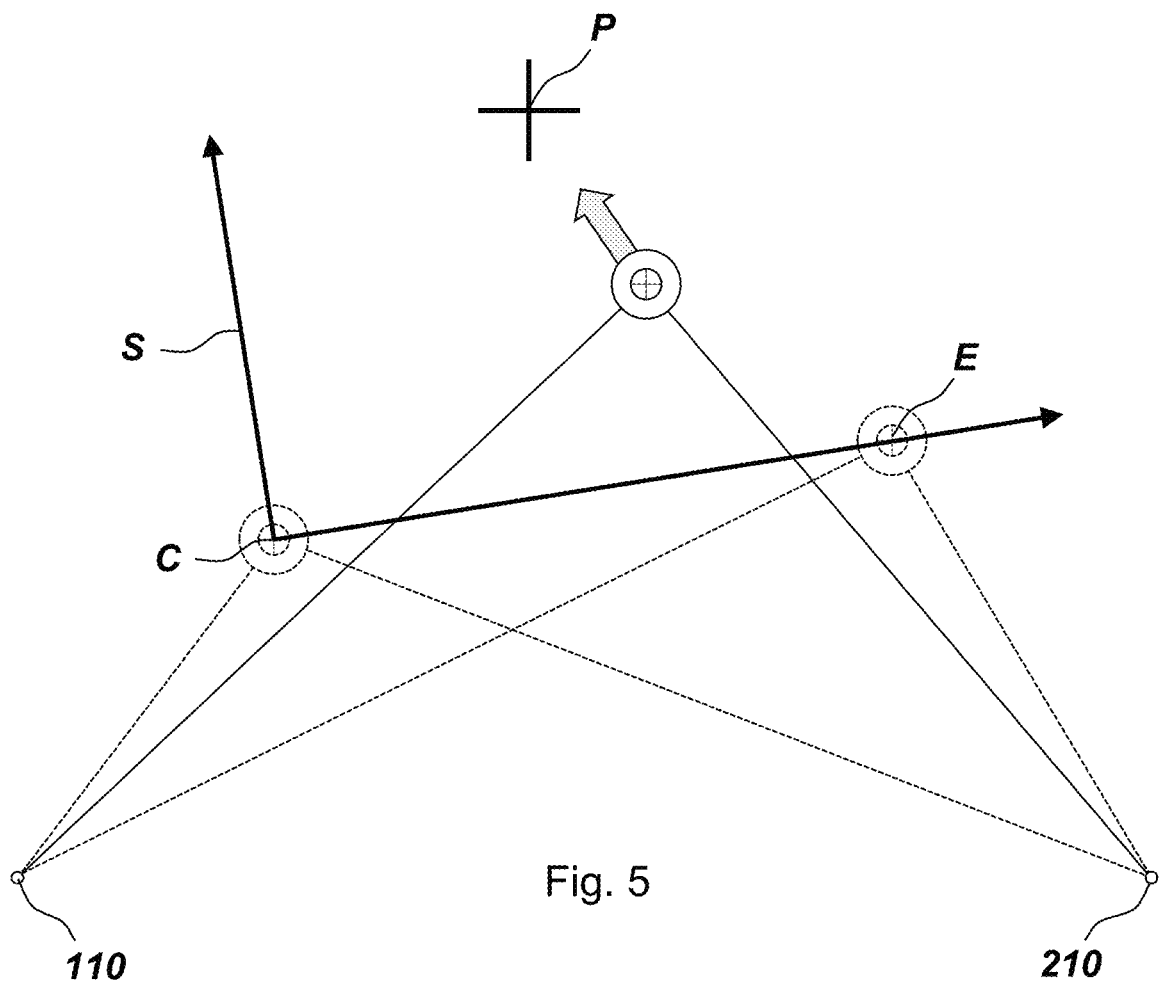
FIG. 5 shows an exemplary use case of the measuring apparatus by which a reference system can be defined.

Accordingly, as will be shown by the example of FIG. 5, the measuring apparatus could be positioned with its reference point(s) onto a corner C of a table, and this corner is then set as the origin of a coordinate system S. The progression of the x-axis is then defined by a distance between the origin and a second position of the pointer tip, where an edge E of the table is located. Once, the coordinate system S is defined like this, the measuring apparatus is positioned such that the reference point(s) is/are aligned with a point P to be measured or to be staked out. The measured data from point P are then expressed in coordinates of S, or respectively, the stake-out point P is known in coordinates of S and can be found by showing the current coordinates or guiding the user towards P.

Before proceeding according to the example of FIG. 5, the second ends of the length measuring bodies are fixed to two measuring points (they are not actively "measured" but their relative positions will be implicit afterwards). Then the distance $d_3$ is determined either (a) by holding the measuring apparatus exactly between the two measuring points, measuring the lengths of the first length measuring body and of the second length measuring body, and adding these two lengths. Alternatively, the distance $d_3$ can be determined (b) by holding the measuring apparatus such that an angle between the first and second length measuring bodies can be measured with an angle measuring device.

For the specific case of a vertical measurement/stake-out, the orientation of the x/y-axes can alternatively be defined by a level or gyroscope optionally comprised by the measuring apparatus in order to align the coordinate system with the gravity field.

Further, the measuring apparatus may comprise a communication module (e.g. Bluetooth, WiFi, radio link, etc.) for transmitting the measured data or raw data to an external device, such as a smartphone or tablet PC. Another purpose of such a communication device is to receive stake-out points which e.g. can be found by the user of the measuring apparatus with help of a display 12/50 where the stake-out points as well as the current position of the measuring apparatus are displayed.

In cooperation with such a display device, the measuring apparatus could also be referenced to a blueprint/map of an environment (room or construction site), wherein the blueprint is e.g. a Portable Document Format (PDF) file. Such maps are sometimes not complete and with the measuring system it is possible to fill them by measuring missing points. The measuring apparatus is referenced into the map by navigating with the reference point(s) at least three measuring points which are already declared on the map and then confirming it with a user interface, e.g. with the display device. Once the three points are defined, a current position of the reference point(s) can be shown in the blueprint, and further points can be measured and added to the blueprint, or further points already comprised by the blueprint can be staked out.

In a special embodiment, a stake-out functionality executable by the arithmetic device can also be realised in a way other than (or additionally to) the aforementioned visual guidance over a displaying device. At least one of the first and second portion may comprise a brake configured for restricting and releasing the extensibility of the respective length measuring body.

Specifically, the brake(s) is/are automatically applied when the correct distance $d_1$ of the first length measuring body is reached (but maybe not yet the correct direction to meet the stake-out point). The operator then walks in a circular trajectory around the second end of the first length measuring body with the first length measuring body being blocked by the brake. During this movement, the second length measuring body is constantly changing in length because the second end of the second length measuring body is attached as well. When the second length measuring body reached the correct position distance, the stake-out point is arrived by the reference point(s) of the measuring apparatus, and the brake of the second portion is applied as well.

If it is not a point but a line to be staked out, the two brakes could also be activated at the same time, i.e. once the reference point(s) has reached the line.

Although the invention is illustrated above, partly with reference to some preferred embodiments, it must be understood that numerous modifications and combinations of different features of the embodiments can be made. All of these modifications lie within the scope of the appended claims.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The invention claimed is:

1. A measuring system comprising:
a measuring apparatus; and
an arithmetic device,
the measuring apparatus comprising:
a first portion comprising a first casing, a first length measuring body, a first length measuring device, and a first reference point, wherein a first end of the first length measuring body is attached to the first casing, a second end of the first length measuring body is extendable away from the first casing, and the first length measuring device is configured to measure a first distance ($d_1$), the first distance extending between the second end of the first length measuring body and the first reference point;
a second portion comprising a second casing, a second length measuring body, a second length measuring device, and a second reference point, wherein a first end of the second length measuring body is attached to the second casing, a second end of the second length measuring body is extendable away from the second casing, the second length measuring device configured to measure a second distance ($d_2$), the second distance extending between the second end of the second length measuring body and the second reference point, and the first portion and the second portion being coupled and configured to be rotatable relative to each other around an axis of rotation (A);
wherein the arithmetic device is configured for:
determining measured data based on at least one of the first distance and the second distance, and
providing the measured data.

2. The measuring system according to claim 1, wherein determining the measured data is based on the first distance measured at a first time, the second distance measured at a second time, the first distance measured at a third time, and the second distance measured at a fourth time.

3. The measuring system according to claim 1, wherein the measuring apparatus further comprises:
a first angle measuring device configured to measure a first angle ($\alpha$), the first angle representing a relative rotational position between the first portion and the second portion with respect to the axis of rotation (A), wherein determining the measured data is based on the first angle.

4. A method comprising:
providing measuring system according to claim 3;
fixing the second end of the first length measuring body at a first measuring point,
fixing the second end of the second length measuring body at a second measuring point;
positioning the measuring apparatus such that at least one of the first reference point and the second reference point lays on a third measuring point;
measuring the first distance ($d_1$);
measuring the second distance ($d_2$);
measuring the first angle ($\alpha$); and
determining a position of the third measuring point relative to at least one of the first measuring point and the second measuring point based on the first distance, the second distance, and the first angle.

5. The measuring system according to claim 1, wherein determining the measured data is based at least on the first distance and the second distance, and wherein the measured data comprises at least one of:
a third distance ($d_3$) extending between the second end of the first length measuring body and the second end of the second length measuring body,
a fourth distance ($d_4$) extending between at least one of the first and second reference points and the third distance ($d_3$) and being aligned in a right angle relative to the third distance ($d_3$),
a fifth distance ($d_5$) forming a right triangle together with the first distance ($d_1$) and the fourth distance ($d_4$),
a sixth distance ($d_6$) forming a right triangle together with the second distance ($d_2$) and the fourth distance ($d_4$),
a second angle ($\beta$) being formed by the third distance ($d_3$) and the first length measuring body,
a third angle ($\gamma$) being formed by the third distance ($d_3$) and the second length measuring body, and
a relative position of at least one of the first reference point and the second reference point.

6. The measuring system according to claim 1, wherein the measuring apparatus further comprises:
a pointer which is coupled with at least one of the first portion and the second portion, the pointer being configured to be rotatable relative to the first portion and the second portion around the axis of rotation, and
a second angle measuring device configured to measure a fourth angle ($\delta$), the fourth angle representing a relative rotational position between the pointer and one of the first portion and the second portion with respect to the axis of rotation (A'),
wherein determining the measured data is based on the first angle, and
wherein the first reference point and the second reference point are both located at a tip of the pointer or located on an axis parallel to the axis of rotation (A') and running through the tip of the pointer.

7. The measuring system according to claim 1, wherein the first reference point and the second reference point are both located on the axis of rotation (A) or on an axis parallel to the axis of rotation.

8. The measuring system according to claim 1, wherein the arithmetic device is configured for receiving a user input, and wherein determining the measured data is based on the user input.

9. The measuring system according to claim 8, wherein the arithmetic device is configured such that the user input effects at least one of zeroing of measurement data,
definition of a measurement mode,
definition of a stake-out mode, and
definition of a coordinate system.

10. The measuring system according to claim 9, wherein the coordinate system is definable based on at least one of
the measured data,
the first distance ($d_1$),
the second distance ($d_2$), and
a third distance ($d_3$) connecting the first end of the first length measuring body with the first end of the second length measuring body.

11. The measuring system according to claim 1, wherein the arithmetic device is configured for generating instruction data for a user for performing a stake-out, and wherein the measuring system comprises a display device which is configured for displaying instructions based on the instruction data.

12. The measuring system according to claim 1, wherein the measuring apparatus further comprises:
a third angle measuring device configured to measure a fifth angle ($\varepsilon$), the fifth angle being formed by
the first length measuring body and a plane perpendicular to the axis of rotation (A,A'), or
the second length measuring body and the plane perpendicular to the axis of rotation,
wherein determining the measured data is based on the fifth angle.

13. The measuring system according to claim 1, wherein the measuring apparatus further comprises:
an adapter configured for mounting a tool such that the tool adopts a predefined pose relative to at least one of the first reference point and the second reference point.

14. A method comprising:
providing a measuring system according claim 1;
fixing the second end of the first length measuring body at a first measuring point;
fixing the second end of the second length measuring body at a second measuring point;
positioning the measuring apparatus such that at least one of the first reference point and the second reference point lays on a third distance ($d_3$) extending between the second end of the first length measuring body and the second end of the second length measuring body;
measuring the first distance ($d_1$) at a first time;
measuring the second distance ($d_2$) at a second time;
determining the third distance ($d_3$) based on the first distance measured at the first time and the second distance measured at the second time;
positioning the measuring apparatus such that at least one of the first reference point and the second reference point lays on a third measuring point;
measuring the first distance ($d_1$) at a third time;
measuring the second distance ($d_2$) at a fourth time; and
determining a position of the third measuring point relative to at least one of the first measuring point and the second measuring point based on the first distance measured at the third time, the second distance measured at the fourth time, and the third distance.

15. The method according to claim 14, comprising:
positioning the measuring apparatus such that at least one of the first reference point and the second reference point lays on a fourth measuring point,
in the same manner as the third measuring point was determined, determining a position of the fourth measuring point relative to at least one of the first measuring point and the second measuring point, defining a coordinate system based on the position of the third measuring point and the position of the fourth measuring point.

\* \* \* \* \*